July 14, 1964
A. STRICKLER
3,141,094
PHOTOELECTRIC IMMERSION PROBE
Filed Oct. 27, 1960
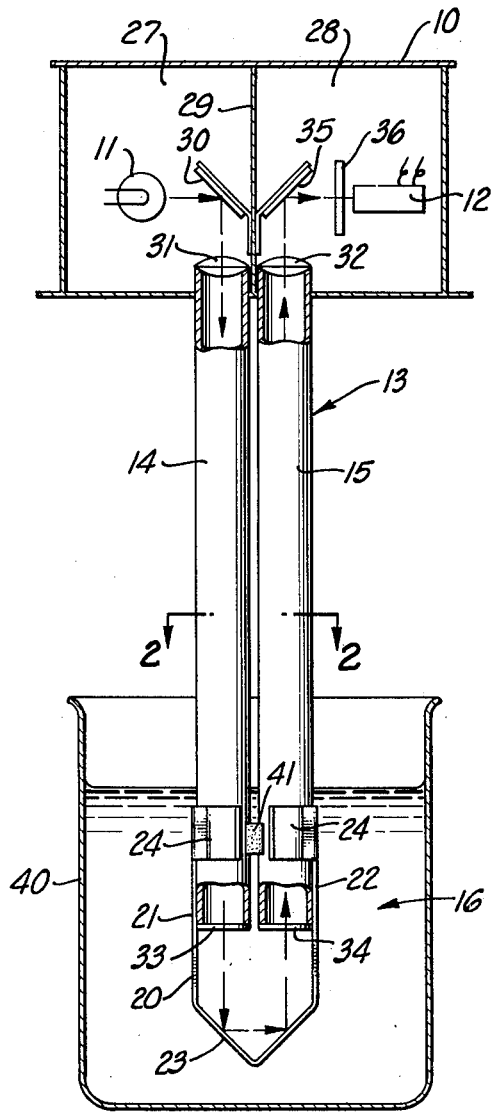
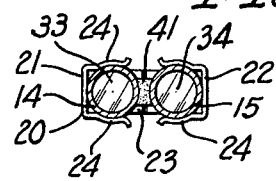
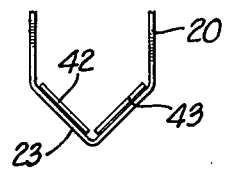
INVENTOR
ALLEN STRICKLER
BY HIS ATTORNEYS
HARRIS, KIECH, RUSSELL & KERN

United States Patent Office 3,141,094
Patented July 14, 1964

3,141,094
PHOTOELECTRIC IMMERSION PROBE
Allen Strickler, Fullerton, Calif., assignor to Beckman Instruments, Inc., a corporation of California
Filed Oct. 27, 1960, Ser. No. 65,452
6 Claims. (Cl. 250—218)

This invention relates to colorimetry and, in particular, to a probe for immersion in fluids for photoelectric absorption measurements and the like.

Photoelectric colorimetry and photocolorimetric titration have generally required passing a radiation beam through the walls of the sample container with the beam directed to an external detector. In such arrangements, the signal is sensitive to any alteration in the geometry of the container and to rotation or a change in relative position between the container and the measuring element or radiation source. Therefore, it has been necessary to make a separate 100% adjustment for each different sample vessel used with the measuring instrument, or to calibrate each such vessel, or to use selected, carefully matched vessels. Also, in order to change the length of the radiation path in the sample, a change in container dimensions is necessary.

It is an object of the invention to provide an immersion probe suitable for photoelectric measurement in which the measurement is independent of the geometry of the container of the sample. A further object is to provide such an instrument where neither the radiation source nor the detector or sensing device is immersed in the sample, eliminating maintenance and leakage problems and permitting a small compact structure.

It is an object of the invention to provide an immersion probe suitable for photoelectric measurements which is extremely insensitive to ambient light and which can be operated in strongly illuminated areas without adverse effects on the measuring accuracy. A further object is to provide an immersion probe in which the optical path length in the sample is easily adjustable, and in which the adjustment is independent of the geometry of the sample container.

It is a particular object of the invention to provide a photoelectric probe for immersion into a fluid for absorption measurement or the like including support means, a radiation source and a radiation sensing device mounted in the support means, and a radiation conductor mounted adjacent one end thereof in the support means and projecting therefrom with the other end of the conductor being immersible in the sample fluid, with the conductor having a radiation inlet and a radiation outlet at the one end and a reflector at the other end and defining a radiation path from the source to the inlet to the reflector and back through the outlet to the sensing device, with the conductor having a gap therein adjacent the projecting end permitting the sample fluid to enter the radiation path. A further object is to provide such an instrument in which the radiation reflector is mounted at the projecting end of the radiation conductor and is spaced therefrom providing the sample opening therebetween. Another object is to provide such a structure wherein the radiation reflector is movable relative to the conductor to vary the path length in the sample.

It is an object of the invention to provide an immersion probe having two radiation conducting shafts mounted adjacent each other with the radiation source and sensing device at one end of the shafts and the reflector at the other ends thereof, with said other ends and the reflector adapted to be immersed into the sample fluid. A further object is to provide such a structure wherein the conducting shafts are tubes having the projecting ends closed for immersion into the sample fluid. Another object is to provide such a structure wherein the reflector includes a pair of reflecting surfaces carried by a clip mounted at the projecting ends of the tubes. A still further object is to provide such a probe which may utilize various types of reflectors, including a polished surface on the reflector support, a separate reflector mounted on the support, and a silvered mirror sealingly mounted on the support.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:
FIG. 1 is a side elevation, partly in section, of a preferred form of the invention;
FIG. 2 is a sectional view taken along the line 2—2 of FIG. 1; and
FIGS. 3 and 4 show alternative forms of the mirror support structure.

Referring to FIG. 1, the instrument includes a housing or support means 10, a radiation source or lamp 11, a radiation sensing device or detector 12, and a radiation conductor 13. The radiation conductor 13 is preferably in the form of two separate conducting shafts, such as tubes 14, 15. The upper ends of the tubes are mounted in the housing 10 and a radiation reflecting device 16 is carried at the lower or projecting ends of the tubes.

In the preferred forms of FIGS. 1 and 2, the radiation reflecting device 16 comprises a stainless steel clip 20 having upstanding arms 21, 22 joined by a V-shaped central section 23. Each of the arms 21, 22 terminates in resilient fingers 24 which grip the tubes 14, 15 for supporting the reflecting device from the projecting tubes. The inner surfaces of the V-shaped section 23 are polished to serve as reflecting surfaces.

The housing 10 is divided into compartments 27, 28 by an opaque barrier 29. The radiation source 11 is positioned in the compartment 27 to direct a radiation beam into the tube 14. A reflecting mirror 30 may be utilized to control the radiation path in the compartment 27. The upper ends of the tubes 14, 15 may be left open, or may be sealed by flat windows, or may be sealed respectively by collimating lens 31 and focusing lens 32 as shown in FIG. 1. The use of the collimating and focusing elements increases the optical efficiency of the system and minimizes the possibility of ambient or stray light reaching the sensing device. The lower ends of the tubes are sealed by flat windows 33, 34 which may be cemented to the tubes. The radiation sensing device 12, which generates an electrical signal as a function of the radiation impinging thereon, is positioned in the compartment 28 for receiving radiation from the tube 15. A mirror 35 may be utilized to control the radiation path within the compartment. A conventional filter 36 may be positioned in the radiation path ahead of the sensing device 12 when desired.

The instrument of FIG. 1 provides a radiation path from the source 11 through the tube 14 to the reflecting surfaces and back through the tube 15 to the sensing device 12. The barrier 29 prevents direct access of radiation from the source to the detector. This path is a function of the geometry of the instrument itself and is essentially independent of the sample or its container. The probe is designed to be immersed into a container 40 of sample so as to place a portion of the sample in the radiation path, the sample occupying the space between the windows 33, 34 and the reflecting surfaces of the clip 20. The instrument is operated in the same manner as conventional photoelectric absorption measuring devices. Typically, the probe would be inserted into a known reference fluid and the electrical output noted or adjusted to a reference point. Then the probe is inserted into the unknown sample and the electrical output again noted. The instrument may be calibrated by using a series of known reference fluids in the conventional manner.

When desired, the radiation path length in the sample can be changed by sliding the clip 20 along the tubes 14, 15. The tubes may be positioned in contact with each other but preferably are spaced slightly by the housing and by a resilient spacer 41. Typically the tubes 14, 15 are made of glass ¼ to ⅜ inch outside diameter providing a probe which fits into a vessel of an inside diameter varying from slightly greater than ½ inch to about 1 inch. Smaller probes could be made if desired. Of course, materials other than glass could be used for the radiation conductor which is immersed in the sample.

In the preferred form shown herein, the interior surfaces of the glass tubes are coated with an opaque paint which excludes ambient light and which may be selected to provide high reflectance at the small angles of incidence encountered. In other alternatives, the inner surface may be metalized or a strip of brightly reflective metal foil in cylindrical form could be inserted in each of the tubes, or the tubes may be formed of opaque material.

An alternative structure for the radiation reflecting devices is shown in FIG. 3, where silvered glass mirrors 42, 43 are affixed, as by cementing with a chemically resistant adhesive, to the V-shaped section 23 of the clip 20. The mirrors preferably are attached with their silvered surfaces facing the clip to protect the silver deposit. FIG. 4 shows another alternative arrangement utilizing silvered glass mirrors which protects the mirrors against corrosion and permits replacement of mirrors when desired. An opening 44 is provided in each face of the V-shaped section 23. A threaded annular flange 45 is positioned around the opening to receive a mating cap 46. A mirror 47 is claimped to the clip 20 by the cap 46 between an annular gasket 48 and another gasket 49. A gasket 50 provides a seal between the cap 46 and the clip 20. The silvered surface of the mirror is placed in contact with the gasket 49.

The instrument of the invention is extremely insensitive to the effects of ambient light. The instrument may be operated in areas having rapid and large changes in illumination without introducing significant error into the meaurements. The radiation path provided by the instrument is almost totally enclosed; and further, it is very difficult for any stray light to enter the system in the sample path area with the particular angular disposition required to reach the detector. Many restrictions on the mode of operation of the instrument are thereby eliminated.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a photoelectric probe for immersion into a fluid for adsorption measurements or the like, the combination of: support means; a radiation source mounted in said support means; a radiation sensing device mounted in said support means; a radiation conductor mounted adjacent one end in said support means and projecting therefrom, with the other end of said conductor being immersible in a fluid; radiation reflecting means; and mounting means for mounting said reflecting means adjacent said other end of said conductor and spaced therefrom, said radiation conductor and said reflecting means defining a radiation path from said source to said sensing means, said radiation path being deflected in said fluid only by said reflecting means, said mounting means including means for varying the spacing between said reflecting means and said other end of said conductor for varying the amount of fluid positioned in said path.

2. A probe as defined in claim 1 including: optical collimating means for collimating radiation directed from said source to said conductor along said radiation path; and optical focusing means for converging radiation from said conductor to said sensing device along said path.

3. In a photoelectric probe for immersion into a fluid for absorption measurements or the like, the combination of: support means; a radiation source mounted in said support means; a radiation sensing device mounted in said support means; first and second tubes mounted adjacent one end in said support means with the other ends thereof projecting therefrom substantially parallel to each other; means for closing said projecting ends; a pair of reflectors; and means mounting said reflectors at susbtantially 90° to each other adjacent and movably spaced from said projecting ends thereby providing a variable length fluid path between said projecting ends and said reflectors and defining a radiation path from said source through said first tube directly to one of said reflectors, then to the other of said reflectors and through said second tube to said sensing device.

4. In a photoelectric probe for immersion into a fluid for absorption measurements or the like, the combination of: support means; a radiation source mounted in said support means; a radiation sensing device mounted in said support means; first and second tubes mounted adjacent one end in said support means with the other ends thereof projecting therefrom substantially parallel to each other; means for closing said projecting ends; and a pair of reflectors mounted at substantially 90° to each other adjacent and spaced from said projecting ends and including means for engaging said tubes permitting movement of said reflectors relative to said tubes thereby providing a variable length fluid path between said projecting ends and said reflectors and defining a radiation path from said source through said first tube directly to one of said reflectors and then to the other of said reflectors and back through said second tube to said sensing device.

5. In a photoelectric immersion probe, the combination of: a closed housing having first and second compartments; a first tube mounted in said housing with one end in said first compartment and the other end projecting from said housing; a second tube mounted in said housing with one end in said second compartment and the other end projecting from said housing parallel to said first tube; a light source positioned in said first compartment for directing light into said first tube; a light sensing device positioned in said second compartment for reception of light from said second tube; means for closing the projecting ends of said tube; and a reflector clip carried at said projecting ends, said clip including resilient means engaging said tubes permitting movement of said clip axially relative to said tubes, said clip including a pair of reflecting surfaces spaced from said tubes and serving as the sole means for reflecting light from said first tube into said second tube.

6. In a photoelectric immersion probe, the combination of: a closed housing having first and second compartments; a first tube mounted in said housing with one end in said first compartment and the other end projecting from said housing; a second tube mounted in said housing with one end in said second compartment and the other end projecting from said housing parallel to said first tube; a light source positioned in said first compartment for directing light into said first tube; a light sensing device positioned in said second compartment for reception of light from said second tube; means for closing the projecting ends of said tube; a reflector clip carried at said projecting ends, said clip including resilient means engaging said tubes permitting movement of said clip axially relative to said tubes, said clip including a pair of mirror mounting surfaces positioned at 90° to each other and at 45° to the axis of said tubes, each of said surfaces having an opening therethrough enclosed by an annular flange directed away from said tubes; a mirror mounted within the flange at each of said surfaces respectively; said mirrors alone deflecting radiation from said first tube to said second tube, and a cover for sealingly engaging each of said flanges respectively for clamping the corresponding mirror in place.

References Cited in the file of this patent

UNITED STATES PATENTS

| | | |
|---|---|---|
| 1,828,894 | Freygang | Oct. 27, 1931 |
| 2,580,500 | Albert | Jan. 1, 1952 |
| 2,727,997 | Schofield | Dec. 20, 1955 |
| 2,892,378 | Canada | June 30, 1959 |
| 2,964,640 | Wippler | Dec. 13, 1960 |
| 3,065,354 | Bird | Nov. 30, 1962 |